Figure 2:
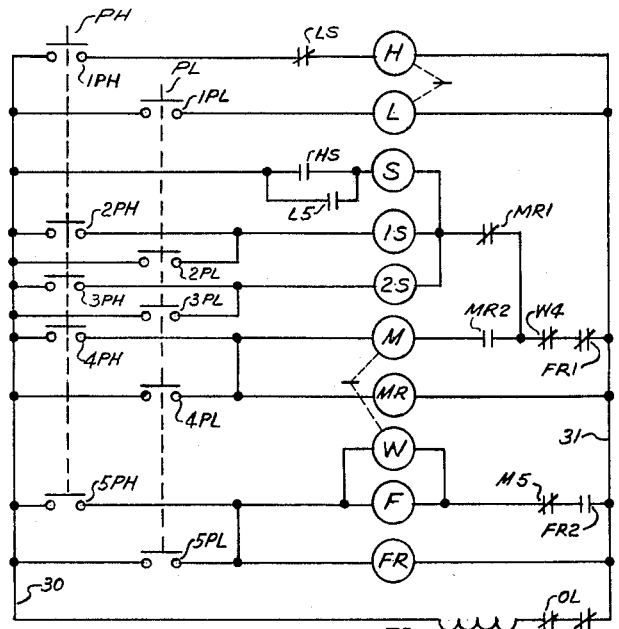
Figure 2:
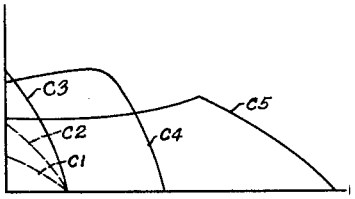

May 21, 1963  D. L. PETTIT  3,090,899
CONTROL CIRCUIT FOR A.C. MOTOR HOIST
Filed April 1, 1960

INVENTOR.
DORN L. PETTIT
BY

United States Patent Office 3,090,899
Patented May 21, 1963

3,090,899
CONTROL CIRCUIT FOR A.C. MOTOR HOIST
Dorn L. Pettit, Wauwatosa, Wis., assignor to Square D Company, Detroit, Mich., a corporation of Michigan
Filed Apr. 1, 1960, Ser. No. 19,384
10 Claims. (Cl. 318—202)

The present invention relates to motor control circuits and is more particularly concerned with a control circuit for an alternating current motor as used in hoist applications.

Hoisting apparatus frequently is powered with alternating current motors which are energized and controlled to move loads of varying weights vertically. Hoisting operations require that the motor used therewith must provide at least two controlled functions, that is, the apparatus must begin operation with a relatively slow speed which is well controlled during the cable tightening and spotting operations and thereafter, move the load at a relatively rapid speed. The above arrangement is employed to minimize the time interval required to transfer a load.

Conventional hoisting apparatus usually has a dual braking system consisting of a parking brake and a load brake. The parking brake is incorporated in the hoisting apparatus for safety purposes and is normally rendered inoperative during hoisting and lowering operations. However, it is arranged to oppose all movement of the load while the motor is de-energized or during power failures.

The load brake, on the other hand, is incorporated in the hoisting apparatus to function during the lowering of the load; that is, during the hoisting operation when the load is being raised, the load brake is rendered inoperative and the motor is required to supply all of the torque necessary to move the load upward vertically. During lowering operations, however, the load brake is arranged to constantly oppose the movement of the load in the downward direction. The control system according to the present invention is particularly suited for the brake system outlined above wherein the motor is required to supply all of the torque while the load is being raised and is required to supply torque to overcome the force of the load brake during the periods when the load is lowered so that in effect the motor drives the load downwardly.

While in the drawings in the attached description a multispeed motor is used, it is clearly apparent that the control circuit according to the present invention is equally suited for use with a single speed alternating current motor wherein at speeds slower than the normal motor speeds, phase voltages across the stator are unbalanced to provide the reduced motor speed operation and includes a conventional contactor arrangement for reversing the direction of phase voltage rotation in the energized stator windings at any one or at all of the operating speeds of the motor so the motor may rotate in either direction of rotation.

One of the main features of the present invention is that the controller will provide additional operating speeds for a motor in addition to those originally built into the motor with a simple, relatively inexpensive, control.

An object of the present invention is to provide the combination of an alternating current motor and a control therefor in which the control provides additional operating speeds for the motor in addition to the number originally designed into the motor.

Another object of the present invention is to provide a motor control which operates a motor in both forward and reverse directions at at least one speed with balanced voltages and at at least one additional speed with unbalanced voltages.

Another object of the present invention is to provide a motor control which operates a multi-speed motor in both forward and reverse directions at at least one speed with balanced voltages and at at least one additional speed with unbalanced voltages and additionally wherein the unbalanced voltages energizing the motor in one direction are greater than the unbalanced voltages operating the motor in the opposite direction for the same speed-point settings of the control.

A further object of the invention is to provide a hoist with a multi-speed motor and a load brake and a control which affects energization of the motor in both directions with balanced phase voltages in all of its normal speed points, and which additionally unbalances the phase voltages in at least one speed point to provide additional hoisting and lowering speeds with the load brake cooperating with the motor in the lowering direction.

Another object of the present invention is to provide the combination of a multi-speed motor and a control which includes a first speed control to effect energization of a first set of stator windings so the voltages therein are unbalanced to cause the motor to operate at a first speed, and a second speed control which will control the energization of the first set of stator windings so the voltages therein are balanced and means interlocking the first and second speed controls to simultaneously render the selected one of them operable and the other one inoperable.

In carrying out the above objects, it is another object to provide a hoist control system and a control therefor wherein the system includes a polyphase alternating current motor and a load brake which is released when the motor is operating in a hoisting direction and is operative to prevent movement of the load in a lowering direction so the motor is forced to drive the load brake and overcome its retarding force on the load and wherein the control employs a multi-tap autotransformer winding which is circuited to apply voltages of selected varying magnitude to one of the windings of the motor, a contactor which is arranged to change the connections between the taps of the autotransformer to vary the said applied voltages, and resistors which are circuited with the transformer windings and contacts of the contactor to limit arcing across the contacts as the contactor changes the circuits to the taps of the transformer to apply the said unbalanced voltages to one of the windings of the motor.

In carrying out the above objects, it is another object of the present invention to arrange the circuit for the cable tightening and spotting speeds for safe failure by depending on the energization of one contactor to transfer from speeds 1 to 2 to 3 and vice versa, thereby minimizing possible loss of control of the load due to coil failure in the critical operations of spotting and cable tightening.

Figure 1:
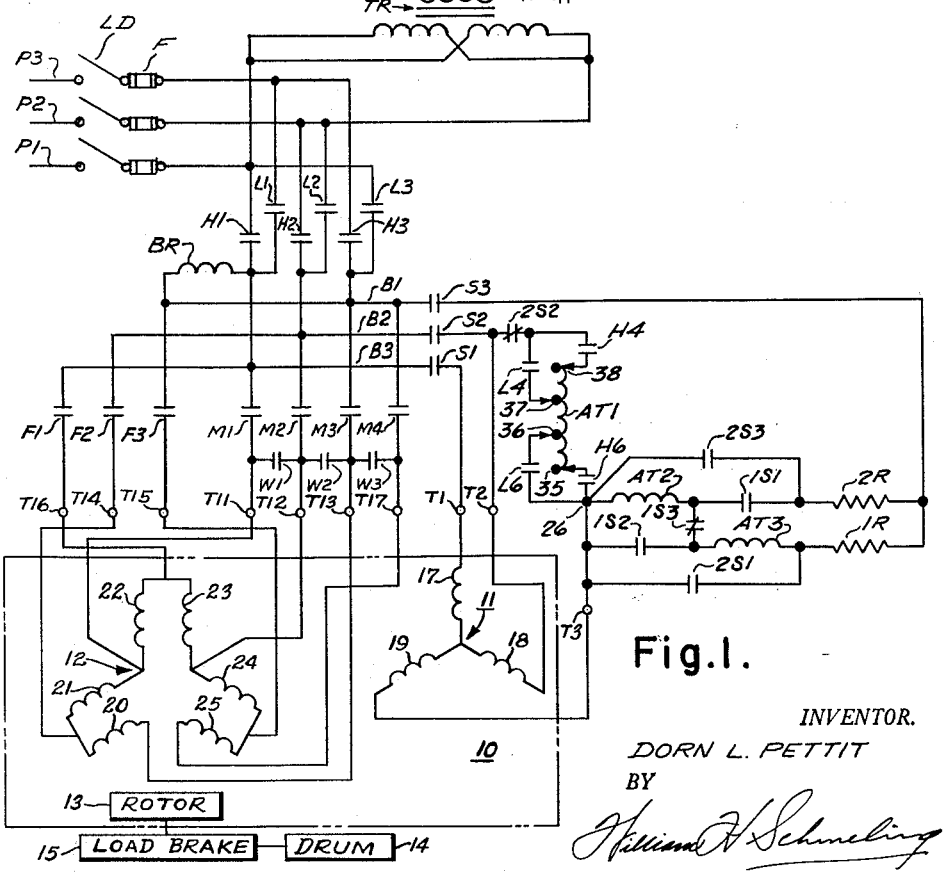

Other objects and a fuller understanding of the present invention may be had by referring to the appended claims, defining the present, new, novel and useful invention or discovery, to the following description of a specific means or method contemplated by the inventor for carrying out his invention and to the accompanying drawings in which:

FIG. 1 is a circuit diagram of the control which controls the energization of a motor, and FIG. 2 is a speed torque curve obtainable from a motor having windings as illustrated and controlled by the control circuit of FIG. 1.

The following description of the attached drawings and the accompanying claims jointly set forth one or more modifications incorporating the present invention and the advancement in the art of motor control circuits. As used through the present description and claims, the specific terms used to identify the parts or components have been arbitrarily chosen to indicate to others commercially available parts or components which may be readily obtained to carry out the specific mode of the invention as described herein, and they are to be interpreted in their broad sense wherein they include electrically or mechanically equivalent components which will provide the same functions as those mentioned herein.

In the following description and as shown in the drawing, the various relays and contactors are illustrated with their respective operating coils represented by a circle and the contacts operated thereby represented by parallel lines. The individual sets of contacts and their operating coils are identified in the drawings either by letters or a combination of letters and numbers with the reference to a respective coil or contact being identified by the reference of the other plus a suffix. It is further noted that where convenient, the letters used as reference characters to identify a relay or contactor coil or its contacts are, to some extent, an abbreviation of the function performed by the respective relay or contactor in the control systems.

A multi-speed motor 10 is represented schematically as having a first set of stator windings 11, a second set of stator windings 12 and a rotor 13. As in nearly all hoists, the rotor 13 is connected to a hoist drum 14. In this instance, a load brake 15 has been inserted in the mechanical connection between the rotor 13 and the drum 14 for purposes as will be described later. The load brake may be of the type illustrated in a Patent No. 1,449,851 issued March 27, 1923, or any other equivalent thereto.

As illustrated in FIG. 2, the motor 10 has speed torque curves one for each speed of the motor, and in which the torque decreases with an increase in speed throughout the speed range of at least the slowest speed. In other words, the motor preferably should have the speed torque characteristics for the slowest speed substantially as shown in curve C3 of FIG. 2. The speed torque curves for the other speeds of the motor may be conventional as shown in curves C4 and C5 of FIG. 2 or may have a speed torque characteristic as exemplified by curve C3 when curve C3 is properly disposed.

To obtain these speed torque curves of FIG. 2, the sets of stator windings, 11 and 12 of the motor 10 are separate from each other and may be connected in different circuit arrangements to a source of power to provide different motor speeds. For purposes of description, the set of stator windings 11 has phase field windings 17, 18 and 19 connected in star and provided with terminals T1, T2 and T3 at their extremities respectively. Winding 12 comprises a plurality of phase windings 20, 21, 22, 23, 24 and 25 connected in series between terminal T13 and terminal T17. In addition, a terminal T14 is provided between windings 20 and 21, a terminal T11 is provided between windings 21 and 22, a terminal T16 is provided between windings 22 and 23, a terminal T12 is provided between windings 23 and 24 and a terminal T15 is provided between windings 24 and 25. The terminals are for connection of lead wires to the motor so that the motor may be operated as a three-phase, three speed, two-winding constant torque motor. When the terminals T1, T2, and T3 are directly connected to respective phase lines P1, P2 and P3 of a source of power, the motor will operate at its slowest speed. Connection of terminals T13 and T17 directly to phase line P3 and terminals T11 and T12 respectively to phase lines P1 and P2 will cause the motor to run at a second or medium speed which is faster than the slowest speed. Connecting terminals T13 to T17, the terminal T16 directly to phase line P1, the terminal T14 to phase line P2 and the terminal T15 to phase line P3 will cause the motor 10 to run at high speed, or at a speed higher than either the slow or the medium speed.

For purpose of easy wiring, and obtaining full control, interposed between the respective motor terminals and the phase lines P1, P2 and P3, are a set of bus bars B1, B2 and B3. The bus bars B1, B2 and B3 are connected to phase lines P1, P2 and P3 through a set of reversing contactors, which are mechanically interconnected to prevent simultaneous operation thereof. The contactors include normally open hoisting contacts H1, H2 and H3 which are closed by energization of a contactor coil H and normally open lowering contacts L1, L2 and L3 which are closed by energization of a contactor coil L. When the hoist contactor coil H is energized the hoisting contacts H1, H2 and H3 close to energize bus bars B1, B2 and B3 in a phase direction for causing the rotor 13 to rotate drum 14 in a hoisting direction.

When the motor is to be operated at normal low speed, the terminals T1, T2 and T3 are energized with balanced phase voltages from bus bars B1, B2 and B3. The connections for the normal low speed operation are by means of normally open contacts S1, S2 and S3, all of which are closed by a contactor coil S. Terminal T1 is connected to bus bar B3, through contacts S1. Terminal T2 is connected to bus bar B2 through contacts S2. Terminal T3 is connected to bus bar B1 through contacts S3, a resistor 1R and normally open contacts 2S1 closed by energizing a contactor coil 2S and a parallel circuit including a resistor 2R, normally open contacts 2S3 closed by energizing the contactor coil 2S.

When the motor is to be operated at a normal medium speed, the terminals T11, T12, T13 and T17 are energized with baranced phase voltages by the bus bars B1, B2 and B3. The connections for the normal medium speed operation are by means of normally open contacts M1, M2, M3 and M4, all of which are closed by the energization of a contactor coil M. Terminal T11 is connected to bus bar B3 through contacts M1. Terminal T12 is connected to bus bar B2 though contacts M2. Terminal T13 is connected to bus bar B1 through contacts M3. Terminal T17 is connected to bus bar B1 through contacts M4.

When the motor is to be operated at a normal fast or high speed, the terminals T16, T14 and T15 are energized with balanced phase voltages from the respective bus bars B1, B2 and B3. The connections for the normal high speed operation are by means of normally open contacts F1, F2 and F3, all of which are closed by the energization of a contactor coil F. Terminal T16 is connected to bus bar B3 by a contact F1. Terminal T14 is connected to bus bar B2 by contacts F2. Terminal T15 is connected to bus bar B1 by contacts F3. In addition to connecting the terminals to the bus bars, the windings in stator 12 must be connected in a parallel Y circuit arrangement for the normal high speed operation. This is accomplished by means of normally open contacts W1, W2 and W3 which are closed by the energization of a contactor coil W. Terminal T11 is connected to terminal T12 by the contacts W1. Terminal T12 is connected to terminal T13 by the contacts W2. Terminal T13 is connected to terminal T17 by the contacts W3.

In addition to the normal slow, medium and fast speeds provided by the above described circuits, two additional speeds are available which are slower than or below the above mentioned normal low speed. These additional speeds are obtained by energizing stator windings 11 with unbalanced phase voltages in place of the balanced phase voltages used in obtaining the normal low, medium and fast speeds. Unbalanced phase voltages for energizing the stator windings 11 are obtained as will become hereinafter apparent.

Closure of either of the switches PH or PL will cause the respective contactor coils H or L to be energized to effect a sequential closure of the contacts H1, H2, H3 and contacts H4 and H5 when the switch PH is closed and a sequential closure of contacts L1, L2, L3 and L4 and L5 when the switch PL is closed. The contactor coils S, 1S, 2S, M, W and F and relay coils MR and FR are connected across leads 30 and 31 as shown in FIG. 2. The contactor coil S is connected to lead 30 through either of the normally open contacts H5 or L5. The contactor coil 1S, is connected to lead 30 through either of the normally open contacts 2PH or 2PL, the contactor coil 2S is connected to lead 30 through either of the normally open switch contacts 3PH or 3PL, and the relay coil MR and the contactor coil M are connected to lead 30 though either of the normally open switch contacts 4PH or 4PL. The contactor coils S, 1S, and 2S are connected to lead 31 through series connected normally closed MR1, W4 and FR1. The relay coil M is connected to lead 31 through series connected normally open contacts MR2 and normally closed contacts W4 and FR1 while the contactor coil MR is directly connected to lead 31.

The contactor coils W, F and relay coil FR are connected to lead 30 through either of the normally open switch contacts 5PH or 5PL. The relay coil FR is directly connected to lead 31 while the contactor coils F and W are connected to lead 31 through series connected normally closed contacts M5 and FR2.

Preferably the contactors W and M are mechanically interconnected as indicated by the dotted line interconnecting coils W and M to prevent simultaneous closure of the contacts M1, M2, M3 and M4 with contacts W1, W2 and W3 to prevent the occurrence of a direct line short across buses B1, B2 and B3 whenever either the hoist or lower contactors contacts are closed.

Conventionally the supply lines P1, P2 and P3 are connected to the control and power circuits for motor 10 by a line disconnect switch LD and fuses FU. The primary winding of a transformer TR which supplies the control circuit is connected across two of the phases, i.e., P1 and P2, of the supply lines P1, P2 and P3. The secondary winding is connected through suitable overload switches OL, having conventional overload characteristics to supply leads 30 and 31. The control system includes a pair of master switches PH and PL which are respectively actuated to accomplish the hoisting and lowering operations. The contacts 1PH, 2PH, 3PH, 4PH and 5PH are mechanically interconnected to be closed in sequence as the operating button of switch PH is moved in incremental steps. In like manner the contacts 1PL, 2PL, 3PL, 4PL and 5PL are sequentially closed as the operator of switch PL is incrementally moved. Switches PH and PL are conventional and their construction and operation is well known in hoist control applications.

The actuating coils of the hoist contactor H and the lower contactor L are connected across lines 30 and 31 through switch contacts 1PH and 1PL respectively. Preferably the contactors H and L are mechanically interlocked as represented by the dotted line interconnecting between the coils H and L to prevent simultaneous closing of the hoist contacts H1, H2, and H3 with lower contacts L1, L2 and L3. Also, if desired, a normally closed limit switch LS may be included in the circuit to coil H to limit travel in the hoisting direction when the hook of the hoist reaches its upper limit of movement.

The circuit for unbalancing the voltages across the winding of motor 1D at terminals T1, T2, and T3 is shown in the lower right hand portion of FIG. 1. This circuit includes an auto-transformer which has winding sections AT1, AT2, and AT3, the resistors 1R and 2R, the normally open contacts S1, S2, S3, 1S1, 1S2, 2S1, 2S3 and the normally closed contacts 2S2 and 1S3. The contacts L4, L6 and H4 and H6 will be either open or closed depending upon the operation of the mechanical interlock between the contactors H and L and the actuation thereof. The function of the above auto-transformer section resistances and contacts will be apparent from the following description.

The motor control operates as follows: Assuming the at rest condition, all contacts are open or closed as indicated in FIG. 1. To hoist a load, the master control is initially positioned to close hoist contacts 1PH. This will cause the motor to hoist at its slowest speed or a speed slower than the normal low speed of the motor when the motor is energized with balanced phase voltages. Closing hoist contacts 1PH energizes contactor coil H, which closes contacts H1, H2, H3, H4, H5 and H6, to apply power to bus bars B1, B2, B3 and contactor coil S. As soon as contactor coil S is energized, it closes contacts S1, S2 and S3. When contacts S1 and S2 close, energy is directly supplied to motor terminals T1 and T2 from buses B3 and B2 respectively. Closure of contacts S3 with contacts 1S1, 1S2, 2S1, 2S3 remaining in the circuit opening position and contacts 1S3 and 2S2 in the circuuit closing position will cause bus B1 to be connected to bus 2 through the following circuit assuming closure of contacts H4 and H6 through actuation of contactor coil H. This circuit includes the following components connected in series; switch S3, resistor 1R, auto-transformer section AT3, closed switch contacts 1S3, auto-transformer section AT2, junction 26 closed contacts H6, auto-transformer section AT1, closed switch contacts H4, closed switch contacts 2S2 and switch contacts S2. It will be seen that the resistor 1R and auto-transformer sections AT1, AT2 and AT3 are connected in series across Buses B1 and B2 and the terminal T3 is connected to junction 26 or to one end of section AT1 while the terminal T2 is connected through switch contacts 2S2 and H4 to the other end of section AT1. The voltage dividing action of the auto-transformer sections AT1, AT2, AT3 and resistor 1R will cause a reduced voltage to be thus applied across motor windings 18 and 19. The motor now operates on unbalanced voltages at the first point hoist speed in accordance with curve C1 in FIG. 2.

If it is desired to increase the speed of the motor, the master control is moved until hoist contacts 2PH close in addition to the already closed hoist contacts 1PH, which remain closed. As soon as hoist contacts 2PH close, contactor coil 1S is energized, causing contacts 1S1 and 1S2 to close and causing contacts 1S3 to open. Under this condition, winding 11 is still energized by unbalanced phase voltages which will cause it to operate in accordance with the second point hoist speed torque curve C2 in FIG. 2 and at a speed slightly higher than the first point hoist speed obtained when only hoist contacts 1PH are closed. This result is obtained because the closing of contacts 1S1 and 1S2 and the opening of contacts 1S3 will cause an increased voltage to appear across section AT1. It is to be noted the closing of contacts 1S2 and 1S3 and the opening of contacts 1S3 will cause section AT2 to be connected in a series circuit with resistor 2R and the section AT3 to be in series circuit with resistor 1R and both of these series circuits are connected in parallel circuit with each other and in series with section AT1. Thus an increased voltage will appear across section AT1 which is impressed across motor windings 18 and 19 causing the motor to operate along curve C2 of FIG. 2.

Closing hoist contact 3PH in addition to and while maintaining closed the hoist contacts 1PH and 2PH results in energization of contactor coil 2S which closes contacts 2S1 and 2S3 and opens contacts 2S2. The closing of contacts 2S1 and 2S3 and opening of contact 2S2 connects motor winding terminal T3 directly to bus bar B1 and in series with the parallel connection of resistors 2R and 1R. While resistors 2R and 1R are connected in the circuit, they will cause winding 11 to be energized by slightly unbalanced phase voltages, however, the motor operates as a balance motor because the unbalance is dependent entirely upon the impedance of resistors 2R and 1R. Both resistors are included in the circuit basically to suppress arcing as the contacts open and hence are selected to have a minimum impedance. Thus, because the resistance of 2R and 1R is low, the phase voltage appearing at terminals T1, T2 and T3 will be substantially balanced. When hoist contacts 3PH are closed, the motor operates in accordance with the third point hoist curve C3 in FIG. 2, which is the normal low speed curve of a motor designed for three-speed operation.

Closing hoist contacts 4PH, in addition to the now maintained closed hoist contacts 3PH, 2PH and 1PH, energizes relay coil MR to open contacts MR1 and close contacts MR2. Opening contacts MR1 de-energize contactor coil S, contactor coil 1S and contactor coil 2S, thereby opening contacts S1, S2 and S3 as well as returning all of the contacts controlled by coils 1S and 2S to the open or closed position illustrated in FIG. 1. Opening of contacts S1, S2 and S3 completely disconnects terminals T1, T2 and T3 from bus bars B1, B2 and B3. Closing of contacts MR2 energizes contactor coil M to close contacts M1, M2, M3 and M4 to energize stator winding 12 by connecting terminals T11, T12, T13 and T17 to the bus bars B3, B2 and B1. This causes the motor to operate at the medium or fouth point hoist speed, on balanced voltages, and in accordance with the speed curve C4 in FIG. 2.

Closing hoist contacts 5PH in addition to, and while maintaining closed hoist contacts 4PH, 3PH, 2PH and 1PH energizes relay coil FR. It is noted that contactor coil F and contactor coil W do not energize at this time because contacts M5 have been held open by the energization of contactor coil M. However, as soon as relay coil FR is energized, it opens contacts FR1 and closes contacts FR2. Opening contacts FR1 de-energizes contactor coil M and relay coil MR in addition to continuing the de-energization of cotnactor coil 2S and contactor coil 1S. As soon as contactor coil M is de-energized, contacts M5 close to conduct current through contactor coil F and contactor coil W. Energized contactor coil W closes contacts W1, W2 and W3 to tie terminals T11, T12, T13 and T17 to a common electrical point which is disconnected from bus bar B1, B2 and B3 because contacts M1, M2, M3 and M4 have been previously opened by de-energization of contactor coil M. Contacts F1, F2 and F3 are now closed to connect terminal T16, terminal T14 and terminal T15 to their respective bus bars B1, B2, and B3. The motor is now connected to operate on balanced voltages at fast or high speed and in accordance with the fifth point hoist speed torque curve C5 in FIG. 2.

It is noted that suitable interlocking has been provided so that the motor stator windings may be connected in only one way at one time to the source of power for each of the different speed points.

If the motor is to be operated in the opposite direction or in the lowering direction, the lower contacts are operated in place of the hoist contacts. Successive closing of lower contacts 1PL, 2PL, 3PL, 4PL and 5PL will cause the motor to operate in the lowering direction.

In this instance, when contacts 1PL or 2PL are closed, the unbalanced voltages on the terminals T1, T2 and T3 are slightly different than the corresponding voltages in the hoisting direction because closure of contacts L4 and L6 and opening of contacts H4 and H6 will slightly alter the auto-transformer action in the sections AT1, AT2 and AT3. The auto-transformer section AT1 is preferably provided with taps 35, 36, 37 and 38. In the circuit illustrated, the junction 26 is connected through contacts H6 to tap 35 and through contacts L6 to tap 36. The bus B2 is connected through switch contacts S2 and 2S2 through either H4 or L4 to tap 38 and 37 respectively. Thus during the hoisting operation when contacts H4 and H6 are closed, the windings 18 and 19 will be energized by the voltage appearing between taps 35 and 38 of the section AT1 and during lowering when contacts L4 and L6 are closed by the voltage appearing between taps 36 and 37. Manifestly connections of these taps may be varied so different hoisting and lowering speeds may be achieved. It is understood that if desired, contacts L4, L6, and H6, H4 may be omitted so that the unbalanced voltages will be the same for both directions of rotation of the motor.

During lowering of a load, the motor 10 cooperates with the load brake 15. The load brake 15 is arranged in a conventional manner to oppose any downward movement of the load. When the rotor 13 rotates in a direction downward, thereby forcing the motor to lower the load, it overcomes the effect of the load brake, thus appearing to be driving the load downward. This effectively results in the motor 10 requiring energization from the source of power when a load is being lowered as well as when a load is being hoisted. Usual practice is to adjust the load brake so that it offers a resistance to rotation of the rotor 13 in the lowering direction and does not resist rotation of the rotor 13 in a hoist direction. Thus, when the master control is operated to close any of the lower contacts, the motor 10 will be energized to cause it to rotate the rotor 13 to overcome the brake effect of the load brake 15.

It has been observed combination of the motor having the characteristics of FIG. 2 and the controller shown in FIG. 1 with the load brake will provide speed load curves of the hoisting apparatus during lowering which are substantially straight lines over all of the speed ranges of the controller. This is extremely desirable as it will permit close control of the hoisting loads during spotting operations. Further, it has been observed the combination will cause the speed-load curves during the third, fourth and fifth hoisting speeds to be substantially straight lines and the curves for the first two lowest speeds to have drooping characteristics thereby permitting close control of the load during cable tightening operations and during hoisting at higher speeds.

In accordance with conventional practice, a parking brake is required in addition to the herein described load brake 15. Parking brakes, as commonly used in the hoisting industry, are of the spring-applied electrically energized coil released type wherein a spring normally sets the brake and a coil BR is energized to release the brake. The parking brake will not be further described since they are commonly used in the trade. Because the parking brake coil BR must be energized whenever the motor is energized, it is connected across one phase of the source of power while the motor is energized. In FIG. 1, the brake coil BR is illustrated as being electrically connected between bus bar B1 and B3 so that it is energized whenever the contacts H1, H2 and H3 or the contacts L1, L2 and L3 are closed.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for hoisting and lowering loads comprising a wound rotor motor having input terminals connected with polyphase motor windings, a source of polyphase voltages for energizing said motor windings, a multi-portion auto-transformer winding, resistors, a first circuit means operative to connect said auto-transformer portions across two leads of the polyphase source with a terminal of the motor connected to a tap between two of the portions of the auto-transformer winding and with one of said resistors in series with the two portions, a second circuit means operative to short out said auto-transformer portions and connect the resistors in parallel with each other in a circuit between a motor terminal and a lead from the polyphase source, means interposed in said circuit means and operative to render each of said circuit means operative and inoperative, and selection means controlling the operation of said means to thereby render any selected one of said circuit means operative while rendering the remaining circuit means inoperative.

2. A device for hoisting and lowering loads comprising a wound rotor motor having input terminals connected with polyphase motor windings, a source of polyphase voltages for energizing said motor windings, a multi-portion auto-transformer winding, resistors, a first circuit means operative to connect said auto-transformer portions across two leads of a polyphase source with a terminal of the motor connected to a tap between two of the portions of the auto-transformer winding and with one of said resistors in series with the two portions, a second circuit means operative to short out said auto-transformer portions and connect the resistors in parallel with each other in a circuit between a motor terminal and a lead from the polyphase source, means interposed in said circuit means and operative to render each of said circuit means operative and inoperative, selection means controlling the operation of said means to thereby render any selected one of said circuit means operative while rendering the remaining circuit means inoperative and direction means for controlling the direction of phase rotation of the voltage of said source to the motor windings to thereby control the direction of rotation of the motor.

3. A device for hoisting and lowering loads comprising a wound rotor motor having input terminals connected with polyphase stator windings, a load brake coupled to said rotor and resisting rotation thereof when the rotor is rotating in a lowering direction, a source of polyphase voltages for energizing said stator windings, a multi-portion auto-transformer winding, resistors, a first circuit means operative to connect said auto-transformer portions across two leads of a polyphase source with a terminal of the motor connected to a tap between two of the portions of the auto-transformer winding and with one of said resistors in series with the two portions, a second circuit means operative to short out said auto-transformer portions and connect the resistors in parallel with each other in a circuit between a motor terminal and a lead from the polyphase source, means interposed in said circuit means and operative to render each of said circuit means operative and inoperative, and selection means controlling the operation of said means to thereby render any selected one of said circuit means operative while rendering the remaining circuit means inoperative, each of said means including contacts and means for opening and closing the contacts to render the respective means operative and inoperative.

4. A device for hoisting and lowering loads comprising; a wound rotor motor having input terminals connected to a polyphase stator winding, a load brake coupled to the rotor of the motor and resisting rotation of the rotor when the rotor is rotated in a lowering direction, a source of polyphase supply voltages for the stator winding, a multi-portion auto-transformer winding, a pair of resistors, a first circuit means operative to connect said auto-transformer windings and resistors across two leads of the polyphase source with one of the portions of the auto-transformer winding connected across two motor input terminals and in series with a parallel circuit which has at least two branches each of which includes a resistor and a portion of the auto-transformer windings, a second circuit means operative to short out all of said auto-transformer portions and connect the resistors in parallel circuit with each other in a circuit between a motor terminal and a lead from the polyphase source, operative means interposed in each of said circuit means to render each of the circuit means operative and inoperative, and selection means controlling the operation of said operative means to thereby render any one of said selected one of the circuit means operative while rendering the remaining circuit means inoperative.

5. A device for hoisting and lowering loads comprising; a wound rotor motor having input terminals connected to a polyphase stator winding, a load brake coupled to the rotor of the motor and resisting rotation of the rotor when the rotor is rotated in a lowering direction, a source of polyphase supply voltages for the stator winding, a multi-portion autotransformer winding, a pair of resistors, first circuit means operative to connect the auto-transformer windings and resistors across two leads of the polyphase source with at least two of said portions and a resistor connected in series with one another with one of the input terminals of the motor connected to a tap between the two portions, a second circuit means operative to connect said auto-transformer windings and resistors across two leads of the polyphase source with one of the portions of the auto-transformer winding connected across two of the motor input terminals and in series with a parallel circuit which has at least two branches each of which includes a resistor and a portion of the auto-transformer windings, a third circuit means operative to short out all of said auto-transformer portions and connect the resistors in parallel circuit with each other in a circuit between a motor terminal and a lead from the polyphase source, operative means interposed in each of said circuit means to render each of the circuit means operative and inoperative, and selection means controlling the operation of said operative means to thereby render any one of said selected one of the circuit means operative while rendering the remaining circuit means inoperative.

6. A device for hoisting and lowering loads comprising; a wound rotor motor having input terminals connected to a polyphase stator winding, a load brake coupled to the rotor of the motor and resisting rotation of the rotor when the rotor is rotated in a lowering direction, a source of polyphase supply voltages for the stator winding, a multi-portion auto-transformer winding, a pair of resistors, first circuit means operative to connect the auto-transformer windings and resistors across two leads of the polyphase source with at least two of said portions and a resistor connected in series with one another with one of the input terminals of the motor connected to a tap between the two portions, a second circuit means operative to connect said auto-transformer windings and resistors across two leads of the polyphase source with one of the portions of the auto-transformer winding connected across two of the motor input terminals and in series with a parallel circuit which has at least two branches each of which includes a resistor and a portion of the auto-transformer windings, operative means interposed in each of said circuit means to render each of the circuit means opeartive and inoperative, and selection means controlling the operation of said operative means to thereby render any one of said selected one of the circuit means operative while rendering the remaining circuit means inoperative.

7. The combination as recited in claim 5 wherein the one portion of the auto-transformer winding is tapped and the motor winding is selectively connected to different taps during the hoisting and lowering operations of the hoist motor.

8. The combination as recited in claim 5 wherein the hoist motor drives a load brake during the operation of the hoist motor in a lowering direction.

9. The combination as recited in claim 5 wherein a single contactor is used to switch the controller between at least two of said different circuit means and the resistors limit commutating current flow through the circuit means during the switching operation.

10. The combination as recited in claim 5 wherein the stator of the motor has additional polyphase windings which are arranged to be connected to the supply for multi-speed operation.

References Cited in the file of this patent

UNITED STATES PATENTS 2,421,431    Pell _____ June 3, 1947